United States Patent
Lee et al.

(10) Patent No.: US 8,503,820 B2
(45) Date of Patent: Aug. 6, 2013

(54) METHOD AND APPARATUS FOR REMOVING IMAGE NOISE

(75) Inventors: Mi-yeon Lee, Suwon-si (KR); Seung-hoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 881 days.

(21) Appl. No.: 12/638,515

(22) Filed: Dec. 15, 2009

(65) Prior Publication Data

US 2010/0150465 A1 Jun. 17, 2010

(30) Foreign Application Priority Data

Dec. 16, 2008 (KR) .................. 10-2008-0128203

(51) Int. Cl.
*G06K 9/40* (2006.01)
(52) U.S. Cl.
USPC ........... 382/275; 382/254; 382/260; 382/261; 382/278; 348/607; 348/620; 348/622; 348/683
(58) Field of Classification Search
USPC ...... 382/254, 260, 261, 275, 278; 348/222.1, 348/606, 607, 620, 622, 683
See application file for complete search history.

(56) References Cited

U.S. PATENT DOCUMENTS

| | | | | |
|---|---|---|---|---|
| 5,025,312 A * | 6/1991 | Faroudja | | 348/620 |
| 5,260,791 A * | 11/1993 | Lubin | | 348/623 |
| 6,281,942 B1 * | 8/2001 | Wang | | 348/607 |
| 6,674,486 B2 | 1/2004 | Ueyama | | |
| 7,424,166 B2 * | 9/2008 | Daly | | 382/263 |
| 7,590,299 B2 * | 9/2009 | Brown Elliott et al. | | 382/260 |
| 7,769,242 B2 * | 8/2010 | Blonde et al. | | 382/272 |
| 8,243,093 B2 * | 8/2012 | Feng et al. | | 348/620 |

FOREIGN PATENT DOCUMENTS

| | | |
|---|---|---|
| JP | 89334 A | 12/1996 |
| KR | 20010109168 A | 12/2001 |

* cited by examiner

*Primary Examiner* — Eric Rush
(74) *Attorney, Agent, or Firm* — Sughrue Mion, PLLC (57) ABSTRACT

Provided are a method and apparatus for removing image noise. The method includes: separating an input image signal into a signal component and a noise component; converting the noise component into a decorrelated noise component that is spatiotemporally decorrelated from neighboring pixels; and generating an image signal by adding the decorrelated noise component to the signal component.

16 Claims, 7 Drawing Sheets

FIG. 8B

METHOD AND APPARATUS FOR REMOVING IMAGE NOISE

CROSS-REFERENCE TO RELATED PATENT APPLICATION

This application claims priority from Korean Patent Application No. 10-2008-0128203,filed on Dec. 16, 2008, in the Korean Intellectual Property Office, the disclosure of which is incorporated herein in its entirety by reference.

BACKGROUND OF THE INVENTION

1. Field of the Invention

The present invention relates to a method and apparatus for processing an image signal, and more particularly, to a method and apparatus for removing image noise by performing spatiotemporal decorrelation on a low frequency noise component of an image signal.

2.Description of the Related Art

In general, noise is unavoidably added to an image signal while the image signal is acquired by a digital camera and transmitted to a digital television (TV) through a broadcast channel.

The noise deteriorates the quality of an image, thereby making it difficult to provide a high quality image to viewers.

Accordingly, there is a demand for technology that can remove image noise in order to obtain a high quality image.

SUMMARY OF THE INVENTION

The present invention provides a method and apparatus for removing image noise by performing spatiotemporal decorrelation on a low frequency noise component of an image signal.

According to an aspect of the present invention, there is provided a method of removing image noise, the method comprising: separating an input image signal into a signal component and a noise component; converting the noise component into a decorrelated noise component that is spatiotemporally decorrelated from neighboring pixels; and generating an image signal by adding the decorrelated noise component to the signal component.

According to another aspect of the present invention, there is provided an apparatus for removing image noise, the apparatus comprising: a signal separating unit separating an input image signal into a signal component and a noise component; a decorrelation performing unit which converts the noise component into a decorrelated noise component that is spatiotemporally decorrelated from neighboring pixels; and an adding unit which adds the decorrelated noise component to the signal component to obtain an output image signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
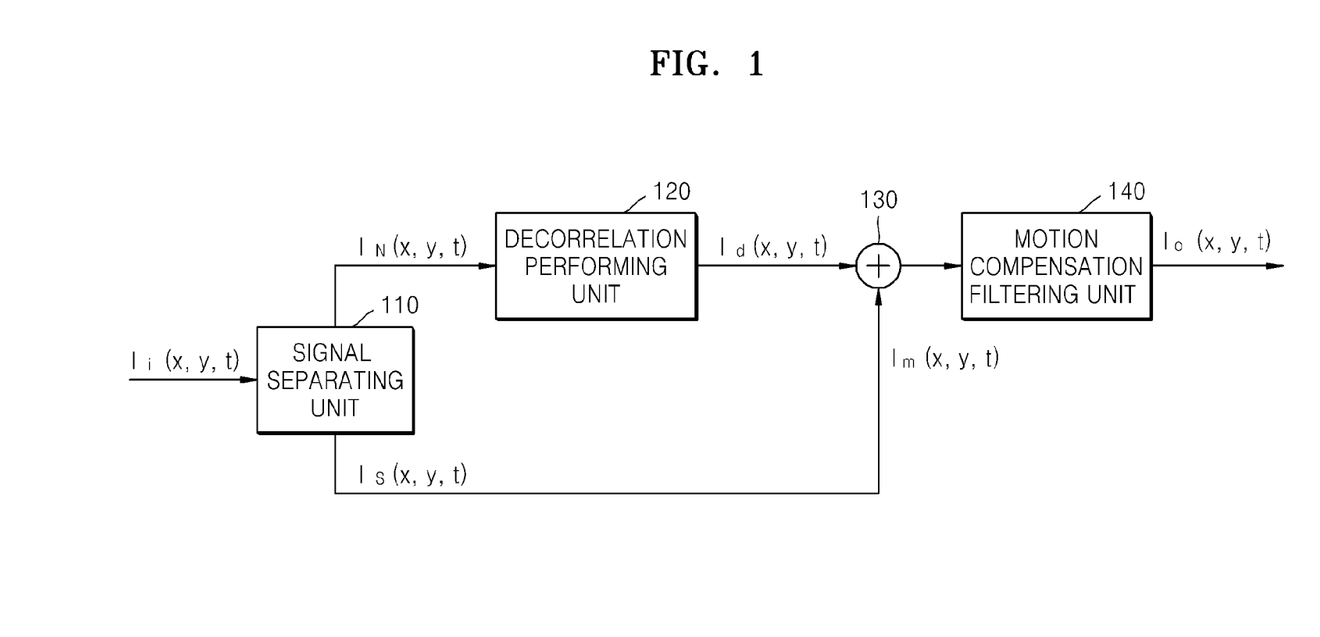
FIG. 1 is a block diagram of an apparatus for removing image noise, according to an exemplary embodiment of the present invention.

FIG. 1 is a block diagram of an apparatus for removing image noise, according to an exemplary embodiment of the present invention.

Referring to FIG. 1, the apparatus includes a signal separating unit 110, a decorrelation performing unit 120, an adding unit 130, and a motion compensation filtering unit 140.

The signal separating unit 110 separates an input image signal $I_i(x,y,t)$ into a signal component $I_S(x,y,t)$ and a noise component $I_N(x,y,t)$. The noise component $I_N(x,y,t)$ includes a general random high frequency component and a low frequency component having spatiotemporal correlation. Noise of the low frequency component includes noise, which is produced when a digital image signal is compressed, and film grain noise, which is produced in a photographic film of a film camera.

The decorrelation performing unit 120 converts the noise component $I_N(x,y,t)$, which is obtained by the signal separating unit 110, into a decorrelated noise component $I_d(x,y,t)$ that is spatiotemporally decorrelated from neighboring pixels. That is, the decorrelation performing unit 120 converts the noise component $I_N(x,y,t)$ into the decorrelated noise component $I_d(x,y,t)$ that is decorrelated from neighboring pixels in a field (or pixels between a previous field and a current field) in such a manner that a noise component of the current field is converted into a high frequency random noise component. Optionally, the decorrelation performing unit 120 generates a high frequency random noise component by selectively outputting the noise component of the current field and a noise component of the previous field according to motion information and a random signal.

The decorrelation performing unit 120 may perform decorrelation differently on a luminance noise component and a chrominance noise component, respectively.

For example, the decorrelation performing unit 120 may convert a luminance noise component of the current field into a high frequency random noise component, and may convert a difference between a chrominance noise component of the current field and a chrominance noise component of the previous field into a high frequency random chrominance noise component.

The adding unit 130 adds the decorrelated noise component $I_d(x,y,t)$, which is obtained by the decorrelation performing unit 120, to the signal component $I_S(x,y,t)$, which is obtained by the signal separating unit 110, to obtain an image signal $I_m(x,y,t)$ and outputs the image signal $I_m(x,y,t)$ that is decorrelated from low frequency noise.

The motion compensation filtering unit 140 performs motion-compensated low-pass filtering on the image signal $I_m(x,y,t)$ of the current field, which is output from the adding unit 130, to obtain an image signal $I_o(x,y,t)$, and outputs the image signal $I_o(x,y,t)$ with no low frequency noise. The motion compensation filtering unit 140 may be an infinite impulse response (IIR) filter.

Figure 2:
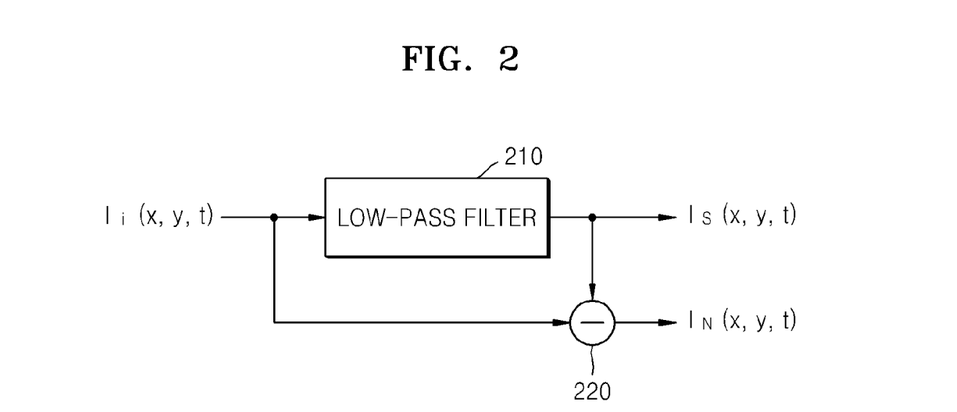
FIG. 2 is a block diagram of a signal separating unit according to an exemplary embodiment of the present invention.

FIG. 2 is a block diagram of the signal separating unit 110 of an apparatus, of which an example is shown in FIG. 1.

The signal separating unit 110 includes a low-pass filter 210 and a subtractor 220.

The low-pass filter 210 performs low-pass filtering on the input image signal $I_i(x,y,t)$ and outputs the signal component $I_S(x,y,t)$ with no noise. The input image signal $I_i(x,y,t)$ includes a luminance component and/or a chrominance component.

The subtractor 220 extracts the noise component $I_N(x,y,t)$ by subtracting the signal component $I_S(x,y,t)$, which is obtained by the low-pass filter 210, from the image signal $I_i(x,y,t)$.

Figure 3:
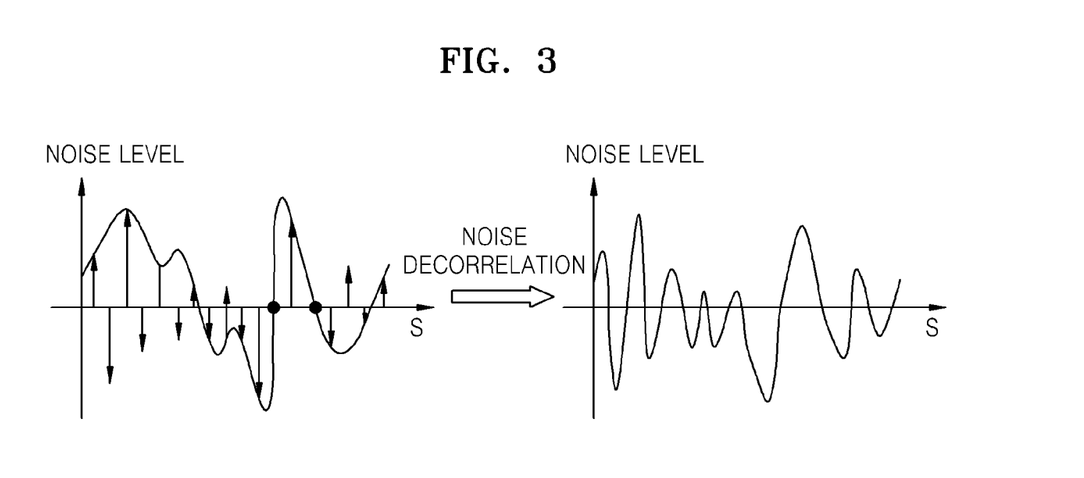
FIG. 3 illustrates a noise waveform for explaining the principle of decorrelation performed by a decorrelation performing unit according to an exemplary embodiment of the present invention.

FIG. 3 illustrates a noise waveform for explaining the principle of decorrelation performed by the decorrelation performing unit 120 of an apparatus, of which an example is shown in FIG. 1.

In FIG. 3, the x-axis represents a coordinate space, and the y-axis represents the level of the noise component.

Referring to FIG. 3, a low frequency noise signal is converted into a high frequency random noise signal after noise decorrelation.

Figure 4A:
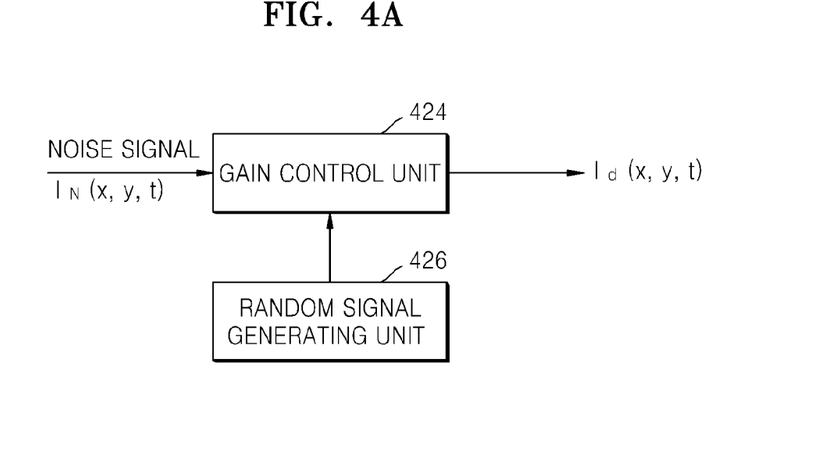
FIG. 4A is a block diagram of the decorrelation performing unit according to an exemplary embodiment of the present invention.

FIG. 4A is a block diagram of the decorrelation performing unit 120 of an apparatus, of which an example is shown in FIG. 1, according to an exemplary embodiment of the present invention.

Referring to FIG. 4A, the decorrelation performing unit 120 includes a gain control unit 424 and a random signal generating unit 426.

The random signal generating unit 426 generates a random number. It should be noted that while the random number in this exemplary embodiment is described as a binary number, the present invention is not limited thereto. One of skill in the art would recognize that other types of values may be used to perform the operations described herein.

The gain control unit 424 adjusts a gain of the noise component $I_N(x,y,t)$ which is a low frequency noise component, according to the random binary number, which is generated by the random signal generating unit 426, and converts the noise component $I_N(x,y,t)$ into a high frequency random noise component.

Figure 4B:
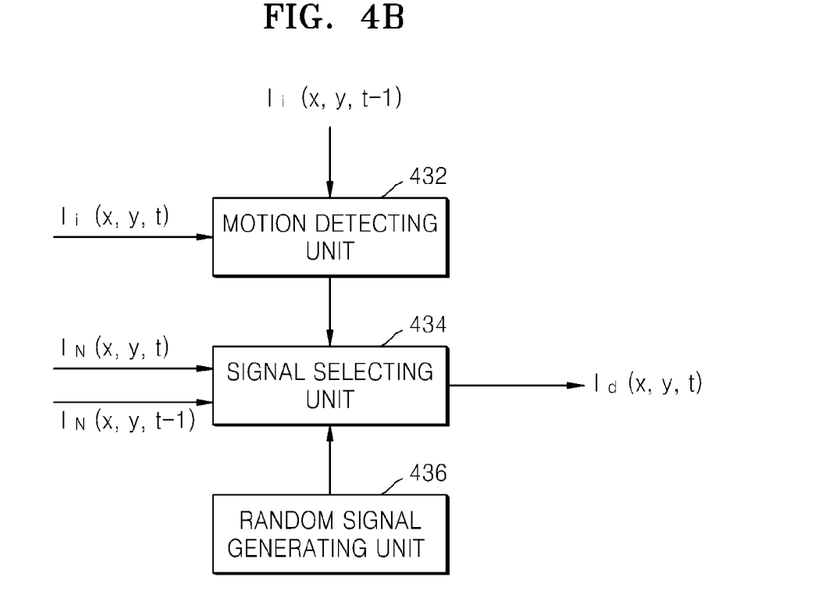
FIG. 4B is a block diagram of the decorrelation performing unit according to another exemplary embodiment of the present invention.

FIG. 4B is a block diagram of the decorrelation performing unit 120 of an apparatus, of which an example is shown in FIG. 1, according to another exemplary embodiment of the present invention.

Referring to FIG. 4B, the decorrelation performing unit 120 includes a motion detecting unit 432, a signal selecting unit 434, and a random signal generating unit 436.

The motion detecting unit 432 determines whether there is image motion by using a difference between the image signal $I_i(x,y,t)$ of the current field and an image signal $I_i(x,y,t-1)$ of the previous field.

The random signal generating unit 436 generates a random binary number.

The signal selecting unit 434 selectively outputs the noise component $I_N(x,y,t)$, e.g., the chrominance noise component, of the current field or a noise component $I_N(x,y,t-1)$, e.g., a chrominance noise component, of the previous field according to the determination result of whether there is image motion, which is obtained by the motion detecting unit 432, and a random binary number signal.

Figure 5A:
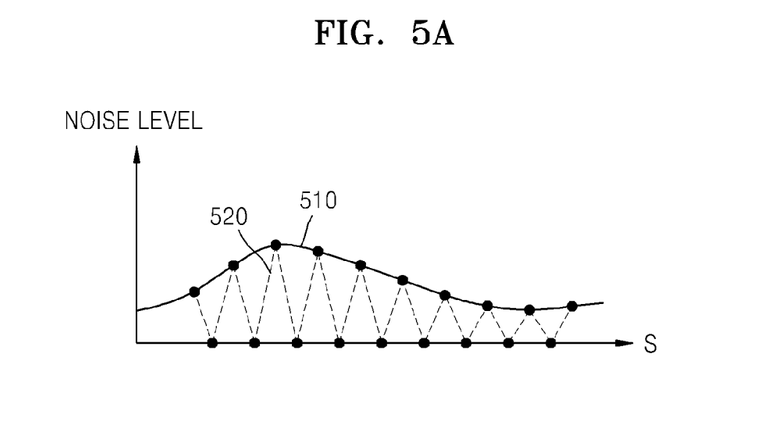
FIG. 5A illustrates the noise waveform of a noise component processed by the decorrelation performing unit according to an exemplary embodiment of the present invention.

FIG. 5A illustrates the noise waveform of a noise component processed by the decorrelation performing unit 120, of which an example is shown in FIG. 4A.

In FIG. 5A, the x-axis represents a coordinate space, and the y-axis represents the level of the noise component.

Referring to FIG. 5A, a low frequency noise signal 510 in space is converted into a high frequency random noise signal 520 (marked by "●") through noise decorrelation. That is, a "0" level value and a current level value are randomly generated according to a random binary noise signal.

Figure 5B:
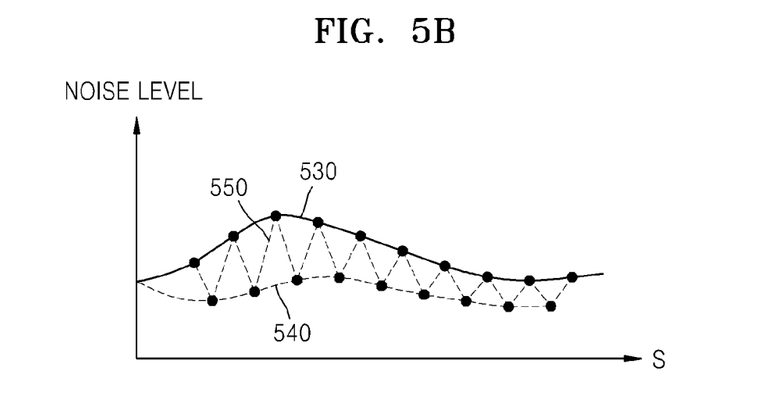
FIG. 5B illustrates the noise waveform of a noise component processed by the decorrelation performing unit according to an exemplary embodiment of the present invention.

FIG. 5B illustrates the noise waveform of a noise component processed by the decorrelation performing unit 120, of which an example is shown in FIG. 4B.

In FIG. 5B, the x-axis represents a coordinate space, and the y-axis represents the level of the noise component.

Referring to FIG. 5B, a low frequency noise signal 530 of a current field and noise 540 of a previous field in space are converted into a high frequency random noise signal 550 (marked by "●") through noise decorrelation.

Figure 6:
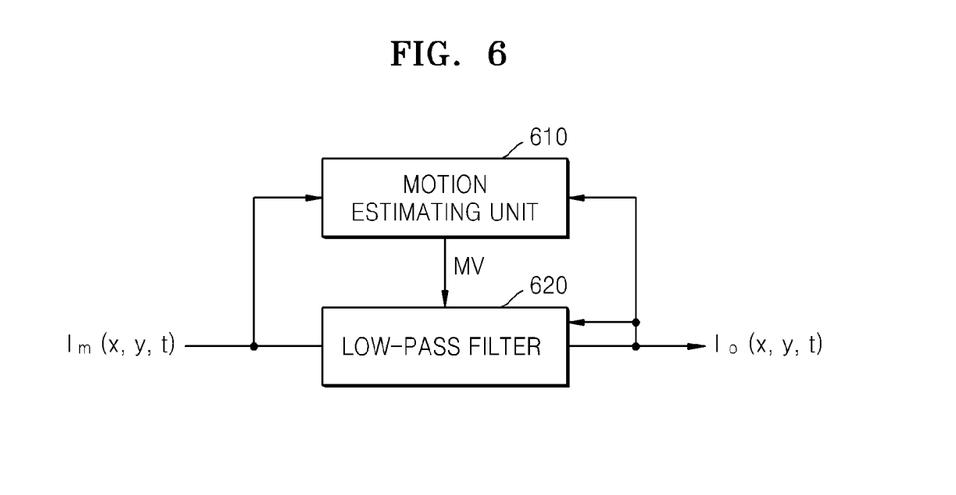
FIG. 6 is a block diagram of a motion compensation filtering unit according to an exemplary embodiment of the present invention.

FIG. 6 is a block diagram of the motion compensation filtering unit 140 of an apparatus, of which an example is shown in FIG. 1.

The motion compensation filtering unit 140 includes a motion estimating unit 610 and a low-pass filter 620.

The motion estimating unit 610 estimates motion by using temporal correlation between adjacent fields or frame images. For example, the motion estimating unit 610 estimates a motion vector MV for each block image by calculating a difference between a block image $I_o(x,y,t-1)$ of a reference field (or the previous field) and a block image $I_m(x,y,t-1)$ of the current field.

The low-pass filter 620 performs motion-compensated low-pass filtering on the image signal $I_m(x,y,t)$, which is output from the adding unit 130, based on the motion vector MV that is obtained by the motion estimating unit 610. The low-pass filter 620 may be an IIR filter having a feedback loop.

Figure 7:
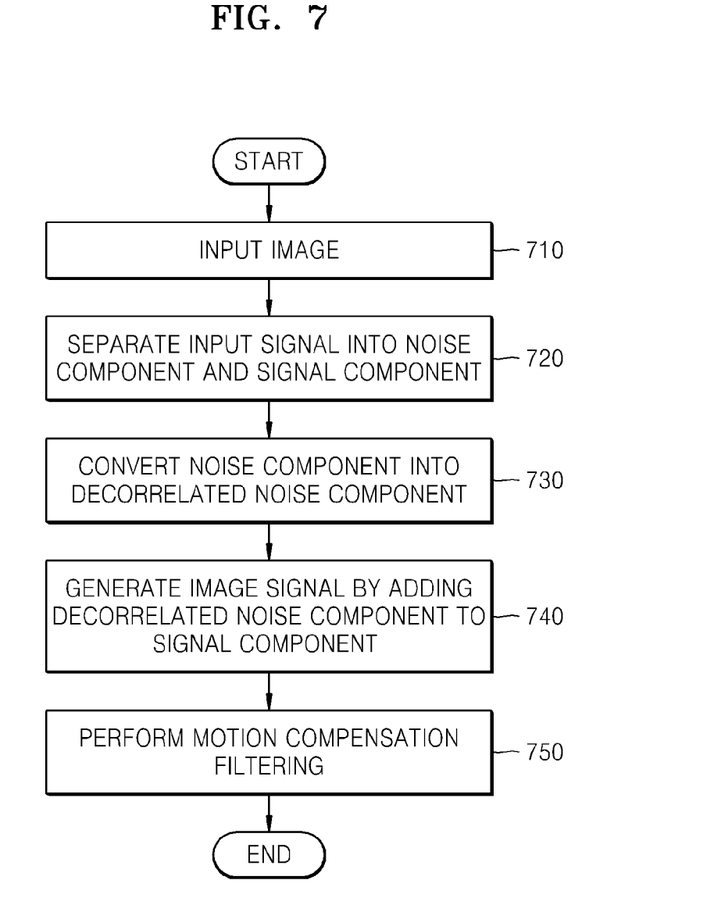
FIG. 7 is a flowchart illustrating a method of removing image noise, according to an exemplary embodiment of the present invention.

FIG. 7 is a flowchart illustrating a method of removing image noise, according to an exemplary embodiment of the present invention.

In operation 710, an image is input.

In operation 720, the input image is separated into a noise component and a signal component by using a low-pass filter.

In operation 730, the noise component is converted into a high frequency noise component (referred to herein as a "decorrelated noise component"), which is spatiotemporally decorrelated from neighboring pixels, through decorrelation.

In operation 740, an image signal is generated by adding the signal component to the decorrelated noise component.

Accordingly, since low frequency noise correlated with neighboring pixels is converted into random (e.g., high frequency noise) decorrelated noise that is spatiotemporally decorrelated from neighboring pixels, an image signal from which the low frequency noise is removed can be obtained.

In operation 750, temporal image noise is reduced by performing motion compensation filtering on the image signal including the decorrelated noise component.

That is, low-pass filtering is performed between a pixel value of the current field and a pixel value of the previous field in which motion is estimated.

For example, the motion compensation filtering may be given by $$(P(x,y,t))+(P(x-mv_x,y-mv_y,t-1))/2 \quad (1)$$

where $P(x,y,t)$ is an image signal of the current field, $P(x,y,t-1)$ is an image signal of the previous field, and $mv_x$ and $mv_y$ are motion vectors of an x component and a y component in a (x, y) coordinate system.

Alternatively, decorrelation may be differently performed on luminance noise and chrominance noise.

In this case, spatiotemporal decorrelation is performed on a chrominance noise component of the chrominance noise to obtain decorrelated chrominance noise, and the decorrelated chrominance noise is removed through motion compensation filtering. The spatiotemporal decorrelation is performed on a still region of an image signal so as not to have a motion afterimage on a screen.

Accordingly, a temporal frequency and a spatial frequency can be increased since spatiotemporal decorrelation is performed on a correlated noise signal and noise included in an image signal can be effectively removed since temporal filtering is performed on a decorrelated noise signal.

Figure 8A:
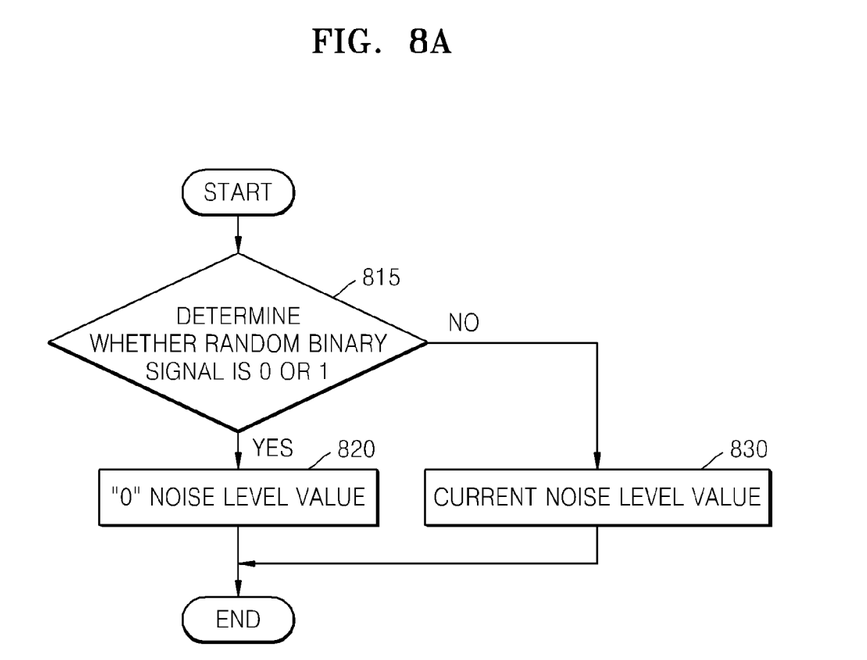
FIG. 8A is a flowchart illustrating a decorrelated noise signal processing process according to an exemplary embodiment of the present invention.

FIG. 8A is a flowchart illustrating a decorrelated noise signal processing process of a method, of which an example is shown in FIG. 7, according to an exemplary embodiment of the present invention.

In operation 815, it is determined whether a random binary number is "0" or "1".

If it is determined in operation 815 that the random binary number is "0", the process proceeds to operation 820. In operation 820, a "0" noise level value is output. Otherwise, if it is determined in operation 815 that the random binary number is "1", the process proceeds to operation 830. In operation 830, a current noise level value is output.

Figure 8B:
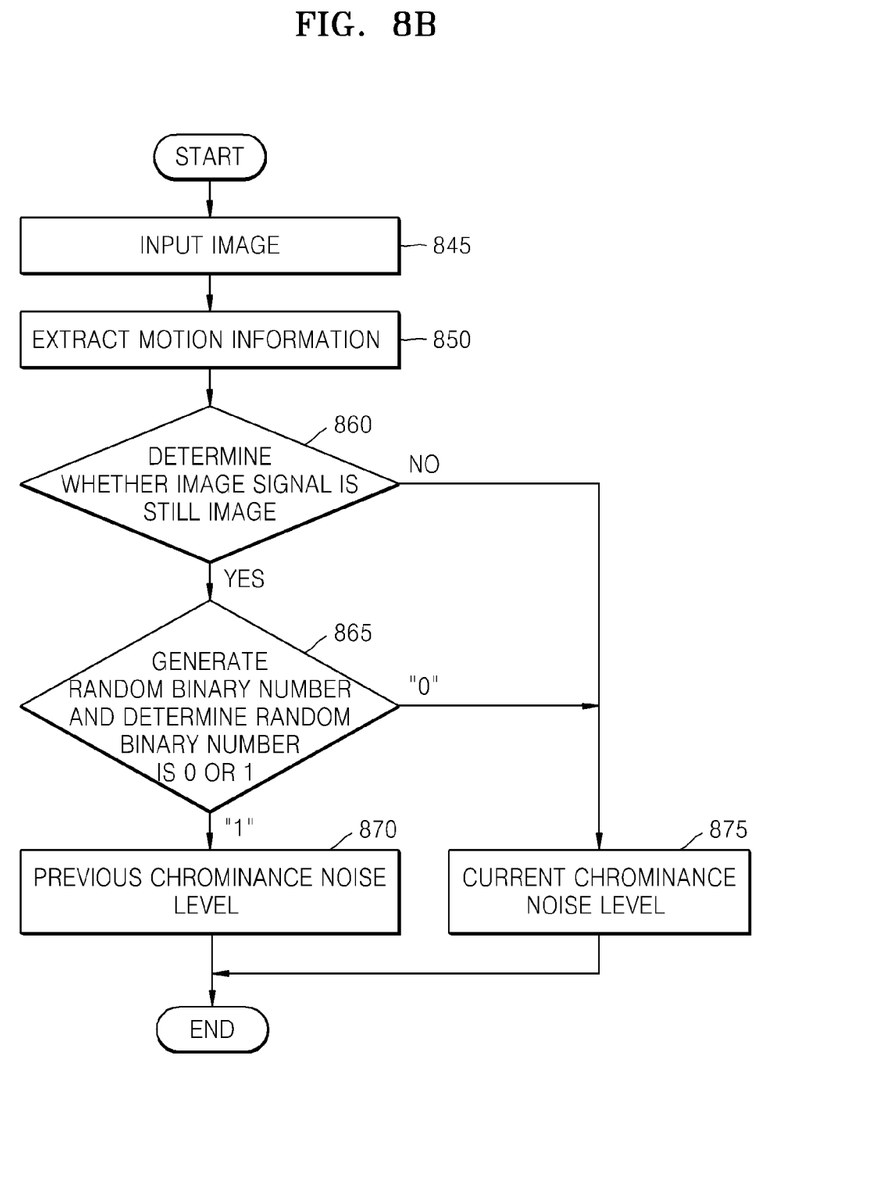
FIG. 8B is a flowchart illustrating the decorrelated noise signal processing process according to another exemplary embodiment of the present invention.

FIG. 8B is a flowchart illustrating a decorrelated noise signal processing process of a method, of which an example is shown in FIG. 7, according to another exemplary embodiment of the present invention.

In operation 845, an image is input through a digital camera or a broadcast channel.

In operation 850, motion information is extracted by using a difference between an image signal of a previous field and an image signal of a current field.

In operation 860, it is determined whether an image signal is a still image by using the motion information.

If it is determined in operation 860 that the image signal is a still image, the process proceeds to operation 865. In operation 865, a random binary number is generated and it is determined whether the random binary number is "0" or "1".

If it is determined in operation 865 that the random binary number is "0", the process proceeds to operation 875. In operation 875, a chrominance noise level value of the current field is output. Otherwise, if it is determined in operation 865 that the random binary number is "1", the process proceeds to operation 870. In operation 870, a chrominance noise level value of the previous field is output.

Otherwise, if it is determined in operation 860 that the image signal is a moving image, the process proceeds to operation 875. In operation 875, the chrominance noise level value of the current field is output.

Another exemplary embodiment of the present invention includes computer-readable codes for performing a method as described hereinabove, whereby the computer-readable codes are stored on a computer-readable recording medium. The computer-readable recording medium may be any data storage device that can store data which can be thereafter read by a computer system. Examples of the computer-readable recording medium include read-only memories (ROMs), random-access memories (RAMs), CD-ROMs, magnetic tapes, floppy disks, and optical data storage devices. The computer-readable recording medium can be dispersively installed in a computer system connected to a network, and stored and executed as a computer-readable code in a distributed computing environment.

While the present invention has been particularly shown and described with reference to exemplary embodiments thereof, the embodiments and terms have been used to explain the present invention and should not be construed as limiting the scope of the present invention defined by the claims. Accordingly, it will be understood by those of ordinary skill in the art that various changes in form and details may be made therein without departing from the spirit and scope of the present invention as defined by the following claims.

What is claimed is:

1. A method of removing image noise, the method comprising:
separating an input image signal into a signal component and a noise component;
converting the noise component into a decorrelated noise component that is spatiotemporally decorrelated from neighboring pixels; and
generating an output image signal by adding the decorrelated noise component to the signal component.

2. The method of claim 1, further comprising performing motion compensation filtering on the output image signal.

3. The method of claim 2, wherein the performing of the motion compensation filtering comprises performing low-pass filtering between a pixel value of a current field and a pixel value of a previous field in which motion is estimated.

4. The method of claim 1, wherein the converting of the noise component into the decorrelated noise component comprises adjusting a gain of a low frequency noise component input according to a random signal and converting the low frequency noise component into a random noise component.

5. The method of claim 1, wherein the converting of the noise component into the decorrelated noise component comprises randomly converting a chrominance noise level of a current field into a chrominance noise level of a previous field.

6. The method of claim 1, wherein the converting of the noise component into the decorrelated noise component comprises:
performing a first decorrelation on luminance noise;
performing a second decorrelation on chrominance noise;
converting a luminance noise component of a current field into a high frequency random noise component; and
converting a chrominance noise level of the current field into a chrominance noise level of a previous field.

7. The method of claim 1, wherein the converting of the noise component into the decorrelated noise component comprises:
extracting image motion information by using a difference between an image signal of a previous field and an image signal of a current field;
determining whether the input image signal is a still image by using the image motion information;

generating a random signal if it is determined that the input image signal is a still image; and converting a chrominance noise level of the current field into a chrominance noise level of the previous field according to the random signal.

8. An apparatus for removing image noise, the apparatus comprising:

a signal separator which separates an input image signal into a signal component and a noise component;

a decorrelator which converts the noise component into a decorrelated noise component that is spatiotemporally decorrelated from neighboring pixels; and an adder which adds the decorrelated noise component to the signal component to obtain an output image signal.

9. The apparatus of claim 8, further comprising a filter which performs motion-compensated low-pass filtering on the output image signal.

10. The apparatus of claim 8, wherein the signal separator comprises:

a low-pass filter which extracts the signal component by performing low-pass filtering on the input image signal; and a subtractor which extracts the noise component by subtracting the signal component from the input image signal.

11. The apparatus of claim 8, wherein the decorrelator comprises:

a random signal generator generating a random number; and a gain controller adjusting a gain of a noise component input, according to the random number, which is generated by the random signal generator, and converting the noise component into a high frequency random noise component.

12. The apparatus of claim 8, wherein the decorrelator comprises:

a motion detector which determines whether there is image motion by using a difference between an image signal of a current field and an image signal of a previous field;

a random signal generator which generates a random number; and a signal selector which selectively outputs one of a chrominance noise component of the current field and a chrominance noise component of the previous field, based on whether there is image motion and the random number.

13. The apparatus of claim 9, wherein the filter comprises an infinite impulse response (IIR) filter.

14. The apparatus of claim 11, wherein the random number is a random binary number.

15. The apparatus of claim 12, wherein the random number is a random binary number.

16. A non-transitory computer-readable recording medium having embodied thereon a program for executing a method of removing image noise, the method comprising:

separating an input image signal into a signal component and a noise component;

converting the noise component into a decorrelated noise component that is spatiotemporally decorrelated from neighboring pixels; and generating an image signal by adding the decorrelated noise component to the signal component.

* * * * *